(12) United States Patent
Song

(10) Patent No.: US 10,999,896 B2
(45) Date of Patent: May 4, 2021

(54) TEMPERATURE CONTROL APPARATUS AND METHOD FOR THE INDUSTRIAL HEATER HAVING AUTO-CORRECTION OF SOAK TIME AND SELF-DIAGNOSIS OF ABNORMAL HEATING FUNCTION

(71) Applicant: V&C-TECH, Daejeon (KR)

(72) Inventor: Bok Han Song, Daejeon (KR)

(73) Assignee: V&C-TECH, Daejeon (KR)

(*) Notice: Subject to any disclaimer, the term of this patent is extended or adjusted under 35 U.S.C. 154(b) by 0 days.

(21) Appl. No.: 16/620,770

(22) PCT Filed: Jul. 4, 2019

(86) PCT No.: PCT/KR2019/008227
§ 371 (c)(1),
(2) Date: Dec. 9, 2019

(87) PCT Pub. No.: WO2020/032396
PCT Pub. Date: Feb. 13, 2020

(65) Prior Publication Data
US 2020/0389940 A1 Dec. 10, 2020

(30) Foreign Application Priority Data
Aug. 10, 2018 (KR) .................. 10-2018-0093564

(51) Int. Cl.
*H05B 1/02* (2006.01)
(52) U.S. Cl.
CPC ......... *H05B 1/0297* (2013.01); *H05B 1/0225* (2013.01)
(58) Field of Classification Search
CPC ....... H05B 1/0297; H05B 1/0225; H05B 1/02
(Continued)

(56) References Cited

U.S. PATENT DOCUMENTS

| 6,555,796 B1* | 4/2003 | Cusack | H05B 1/0283 |
| | | | 219/481 |
| 7,038,172 B1* | 5/2006 | Stuck | A47J 37/044 |
| | | | 219/388 |
| 9,736,995 B2* | 8/2017 | Pauls | A01G 9/24 |

FOREIGN PATENT DOCUMENTS

| JP | 08068534 A | 3/1996 |
| JP | 2006274286 A | 10/2006 |

(Continued)

OTHER PUBLICATIONS

Korean International Search Report for International Application No. PCT/KR2019/008227, dated Oct. 17, 2019.

*Primary Examiner* — Mark H Paschall
(74) *Attorney, Agent, or Firm* — Nixon Peabody LLP; Thomas P. Pavelko

(57) ABSTRACT

Provided is a temperature controller for an industrial heating apparatus adjusting a soak time on the basis of the variation of the thermal energy. Accordingly, since a temperature equilibrium time point of the center is determined by reflecting a temperature tolerance in the chamber and a soak time is corrected and since the temperature equalization time point is set on the basis of a full load state in which the variation of the input thermal energy per time is the smallest, the temperature at the center falls within an allowable upper/lower limit range even if a partial load state is applied, whereby the temperature control apparatus and method for an industrial heater applicable regardless of the amount of heating targets may be provided.

7 Claims, 4 Drawing Sheets

(58) Field of Classification Search
USPC .... 219/121.43, 492, 494, 497, 388; 392/498
See application file for complete search history.

(56) References Cited

FOREIGN PATENT DOCUMENTS

| KR | 1020060032715 | 4/2006 |
| KR | 100931783 | 12/2009 |
| KR | 1020150106626 | 9/2015 |

* cited by examiner

TEMPERATURE CONTROL APPARATUS AND METHOD FOR THE INDUSTRIAL HEATER HAVING AUTO-CORRECTION OF SOAK TIME AND SELF-DIAGNOSIS OF ABNORMAL HEATING FUNCTION

CROSS REFERENCE TO RELATED APPLICATIONS

This application is the United States National Phase filed under 35 U. S. C. § 371 of International Application filed under the Patent Cooperation Treaty ("PCT") serial number PCT/KR2019/008227, filed on Jul. 4, 2019, which in turn claims priority under 35 USC § 119 to Korean Patent Application No. 10-2018-0093564, filed on Aug. 10, 2018, in the Korean Intellectual Property Office, the disclosure of which is incorporated herein by reference in its entirety.

TECHNICAL FIELD

The present invention relates to a temperature control apparatus and method for an industrial heater having auto-correction of soak time and self-diagnosis of abnormal heating function, and more particularly, to a temperature control apparatus and method for reducing a soak time of an industrial heater to thereby shorten a cycle time to improve productivity and reduce wasted thermal energy and for reducing an emission of carbon dioxide that occurs due to an operation of the heater.

BACKGROUND ART

A heat treatment process using various industrial furnaces, surface treatment equipment, food processing equipment, and cooking equipment (hereinafter, referred to as "heating apparatus") includes a combination of a ramp stage to heat (temperature increasing) or cool (temperature decreasing) the chamber to be heated to a predetermined temperature and a soak stage to maintain for a certain time at the predetermined temperature. Control technologies of various heating apparatuses commercialized in modern times have significantly advanced and the degree of controlling temperatures is excellent.

However, in an industrial heating system, a heater, which is a heating element, is installed at the outer side due to restrictions of space in the chamber, and thus, the center of the chamber takes more time to reach the predetermined temperature than the periphery.

In addition, in a case where the chamber is partially loaded as necessary, for example, when only 300 kg or 500 kg with respect to 1 ton capacity is loaded, setting a soak time with respect to 1 ton may involve a waste of time and increase energy and an exhaust gas.

Here, the soak time, in other words, a time for which an indication value of a control temperature sensor reaches a set value and the chamber is maintained at the temperature, refers to the sum of a temperature equalization time required for the center or the like, to which heat is transferred the most late, to reach the set temperature and an additional time for a reaction after the temperature equalization as necessary. Here, since the temperature equalization time (time point) which is varied according to the amount of the load (heating target) cannot be conveniently measured in real time, an excessive time is typically set with respect to a normal capacity of a heating apparatus, resulting in waste at the soak stage.

In order to solve this problem, a technology for measuring a thermal equilibrium time and reducing the soak time by monitoring a thermal energy supply amount according to temperatures detected at the center was developed.

In this regard, in Korean Patent Registration No. 10-0931783 (Title of invention: Heating apparatus having a function of measuring time required for temperature equalization and a control method thereof) discloses a heating apparatus having a temperature equalization time point measuring function which determines a required temperature equalization time by input energy, enabling accurately determining the required temperature equalization time point regardless of charging conditions, thereby preventing a waste of energy, shortening a heating time to improve productivity, and preventing some parts of the load(heating targets) from being heated for a longer period of time than necessary.

However, in the actual process, a temperature difference of an upper and lower limit range compared to a set temperature is allowed, and in the case of a steel heating furnace allowing a large temperature difference between the periphery and the center, a temperature at the center may need to reach a lower specification limit, and thus, if a soak time is determined as a time required for reaching a thermal equilibrium state, i.e., a perfect temperature equalization, the soak time may be longer than a soak time of an existing process. Therefore, in order to more efficiently shorten the soak time in the heating process, calculation of a variation (the amount of change) of thermal energy applied per unit time at the lower specification limit is required during a soak operation after the temperature rises (ramp-up) for determining a temperature equalization time point reflecting the temperature tolerance, or calculation of a variation of thermal energy applied per unit time at an upper specification limit is required at a soak operation after the temperature falls (ramp-down). Further, a technique for automatically diagnosing when a heater, heat insulation of a heating chamber, or a temperature sensor is abnormal is required.

RELATED ART DOCUMENT

[Patent Document]
Korean Patent Registration No. 10-0931783 (Title of invention: Heating apparatus having a function of measuring time required for temperature equalization and a control method thereof)

DISCLOSURE

Technical Problem

An object of the present invention is to provide a temperature control apparatus and method for an industrial heater, capable of further shortening a soak time by determining a temperature equalization time point with respect to a variation of thermal energy applied per unit time at a time point where an allowable temperature limit (lower specification limit or upper specification limit) of a soak operation is reached in a full load state of a heating target and correcting the soak time.

Technical Solution

In one general aspect, a temperature control apparatus for an industrial heater includes: a chamber accommodating a heating target; a heater inputting thermal energy to heat the interior of the chamber; a control temperature sensor measuring a temperature of the chamber interior; and a controller detecting a variation of the thermal energy or a variation of a thermal energy regulating signal, determining a temperature equalization time point on the basis of the variation of the thermal energy or the variation of the thermal energy regulating signal, and adjusting a soak time.

Here, the controller controls the input thermal energy by detecting the temperature of the chamber (by a control temperature sensor), and when there is temperature tolerance between the center and the periphery of the chamber, the controller may detect an arrival time point at which the temperature at the center reaches a minimum allowable temperature (lower specification limit) and set the soak time with respect to a variation of input thermal energy per unit time at the arrival time point.

The controller may set the soak time with respect to a state in which a maximum accommodatable amount of heating targets are accommodated in the chamber (that is, a state in which the chamber is fully loaded with the heating targets), detects a change in the input thermal energy when at least some of the heating targets are accommodated in the chamber (that is, when partially loaded), determines that the soak time arrives when the variation of the input thermal energy per unit time which is the reference is reached, and may controls the heater so that the temperature in the chamber is kept constant after the soak time.

The controller may store an amount of the heating targets and a variation of the input thermal energy per unit time at a minimum allowable temperature arrival time in a state in which the heating objects are partially accommodated, and set the soak time with respect to the stored variation of the input thermal energy per unit time when heating targets having a load amount equal to or smaller than the stored amount is accommodated in the chamber.

The controller may set an allowable range of a thermal energy supply amount per time (at every or some time points), and when the thermal energy supply amount per time exceeds the preset allowable range, the controller may generate an alarm message so that an operator or a manager recognizes the alarm message.

The controller may store the input thermal energy as data and sets the allowable range of the thermal energy supply amount per time on the basis of the stored data.

The controller may determine an average value of data of the thermal energy supply amount per time from the cases where the same amount of heating targets are accommodated, and generate the alarm message when the thermal energy supply amounts at some time points exceeds the corresponding average value by a preset error.

In another general aspect, a temperature control apparatus for an industrial heater includes: accommodating a maximum accommodatable amount of heating targets in a chamber; inputting thermal energy so that a heater heats the interior of the chamber; adjusting, by a controller, the input thermal energy by detecting an temperature of the interior atmosphere of chamber through a control temperature sensor, and storing, by the controller, a variation of the input thermal energy per unit time at a minimum allowable temperature arrival time, as a reference of a soak time, when a temperature of the center of the chamber reaches the minimum allowable temperature by measuring with a separately located temperature sensor at the center; returning the chamber to an initial state when heating for a reference setting is terminated; accommodating at least some of the heating targets in the chamber; re-inputting thermal energy so that the interior of the chamber is heated by the heater; and detecting, by the controller, a variation of the re-input thermal energy, determining that the soak time arrives when the variation of the input thermal energy per unit time as the reference is reached, and controlling the heater so that a temperature in the chamber is kept constant after the soak time as necessary.

Advantageous Effects

Accordingly, the soak time may be corrected on the basis of the temperature equalization time point reflecting an temperature tolerance prior to a thermal equilibrium time point at the center, and the temperature equalization time point is determined on the basis of a full load state in which the variation of the input thermal energy per unit time is the smallest at a minimum allowable temperature time point and the soak time is corrected, and thus, since the temperature at the center at the determined temperature equalization time point exceeds the lower specification limit, the temperature control apparatus and method for an industrial heater applicable regardless of the amount of heating targets may be provided.

DESCRIPTION OF DRAWINGS

The above and other objects, features and advantages of the present invention will become apparent from the following description of preferred embodiments given in conjunction with the accompanying drawings, in which.

BEST MODE

Hereinafter, embodiments of the present invention will be described in detail with reference to the accompanying drawings. The following embodiments are provided as examples in order to convey the spirit of the present invention to those skilled in the art to which the present invention pertains. Accordingly, the present invention is not limited to the following embodiments and may be variously embodied.

Figure 1:
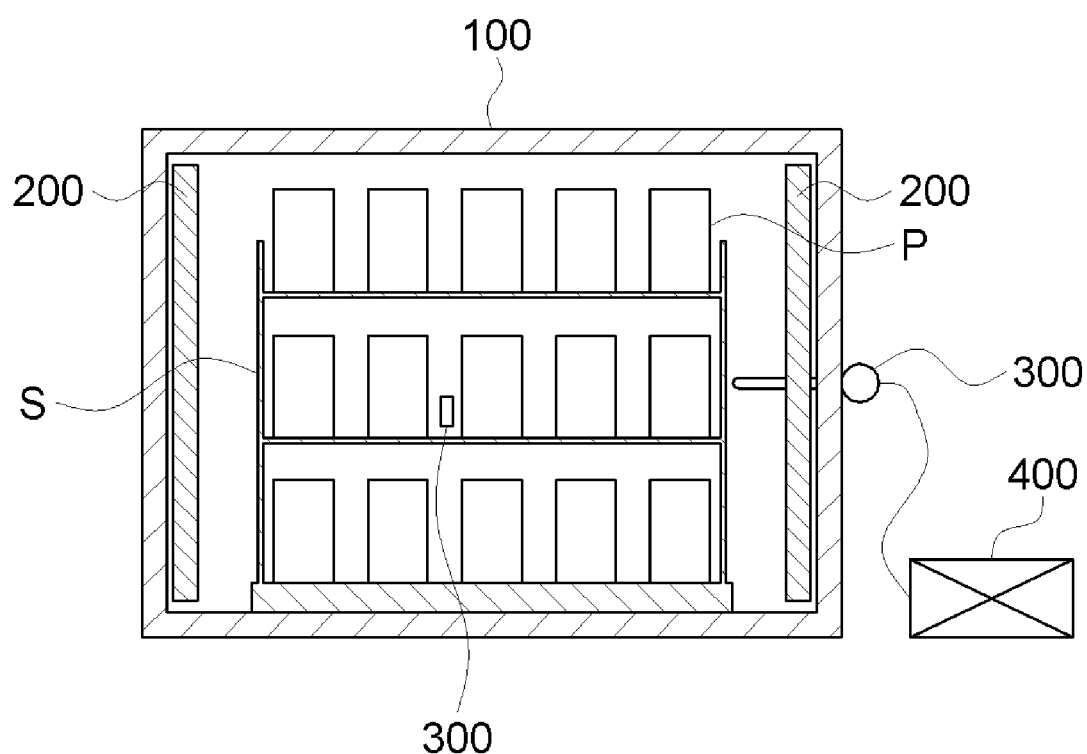
FIG. 1 is a view illustrating an industrial heating apparatus according to an embodiment of the present invention.
Figure 2:
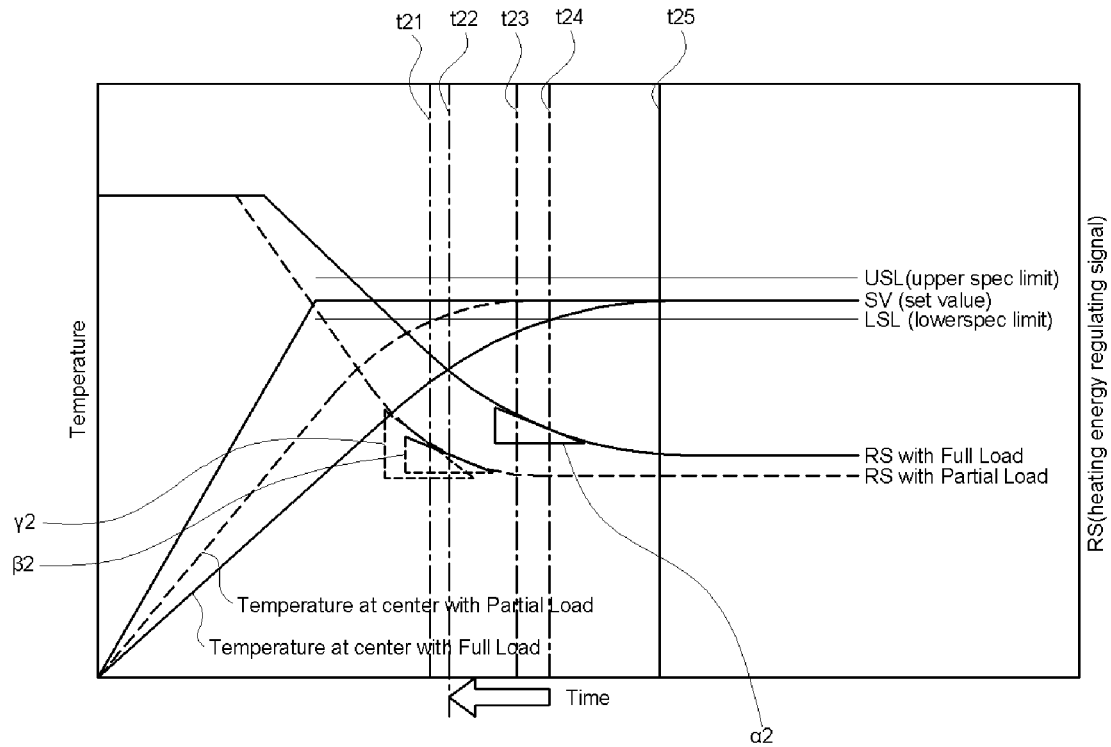
FIG. 2 is a view illustrating measurement of a temperature equalization time point at a soak operation after a ramp-up of an industrial heating apparatus according to an embodiment of the present invention.
Figure 3:
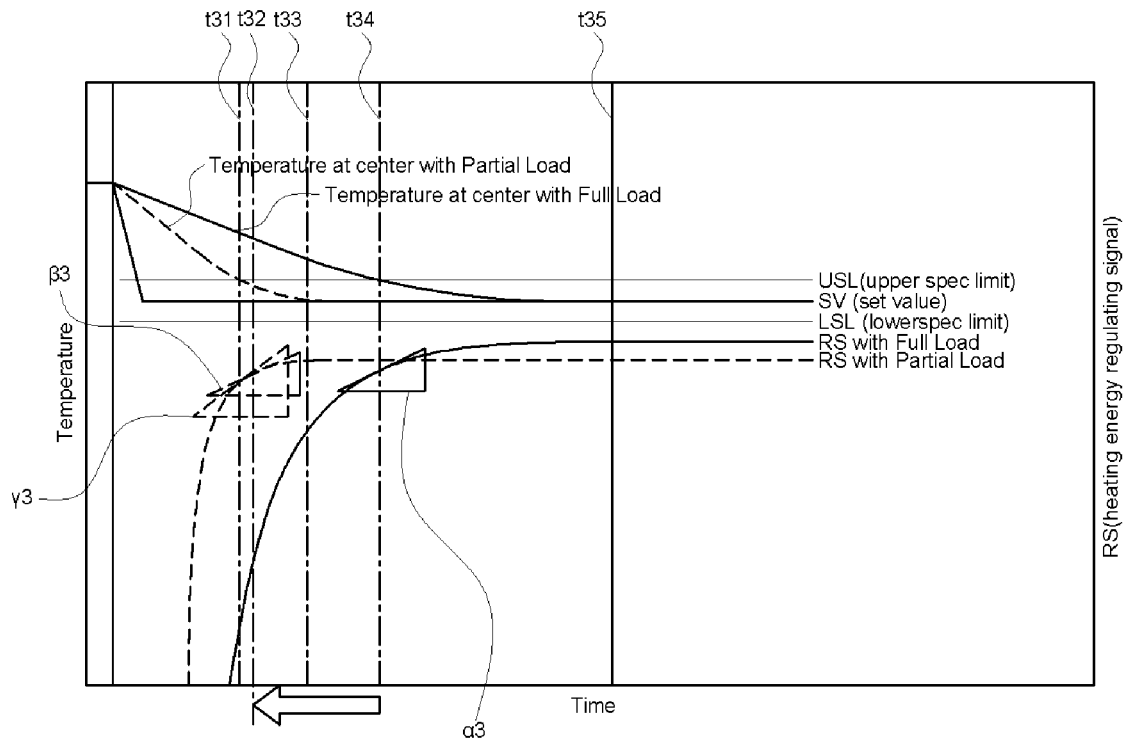
FIG. 3 is a view illustrating measurement of a temperature equalization time point at a soak operation after a ramp-down of an industrial heating apparatus according to an embodiment of the present invention.

FIG. 1 is a view illustrating an industrial heating apparatus according to an embodiment of the present invention, FIG. 2 is a view illustrating measurement of a temperature equalization time point at a soak operation after a ramp-up of an industrial heating apparatus according to an embodiment of the present invention, and FIG. 3 is a view illustrating measurement of a temperature equalization time point at a soak operation after a ramp-down of an industrial heating apparatus according to an embodiment of the present invention.

The temperature control apparatus for an industrial heater of the present invention is provided to further shorten a soak time by setting a temperature equalization time point on the basis of a variation of input thermal energy (or heating energy) per unit time at a time point where a minimum allowable temperature (lower specification limit) arrives in a state in which an object to be heated (or heating target) is fully loaded.

To this end, the industrial heating apparatus includes a chamber 100, a heater 200, a control temperature sensor 300, and a controller 400.

The chamber 100 refers to a furnace prepared to accommodate heating targets P and sealed to heat components or the like for an industrial heat treatment. In the chamber 100, the heating targets P may be fully or partially loaded as necessary. In addition, the interior of the chamber 100 may include a mounting table S for loading the heating target P.

The heater 200 is provided to increase the temperature of the interior or the chamber 100 by inputting thermal energy into the chamber 100. Through the heater 200, the temperature of the interior of the chamber 100 may be increased until a set temperature (or set value (SV)) is reached.

The SV may vary depending on a type of the heating targets P and may be input and set by a user. Through the heater 200, a temperature of the heating target P may be increased to the SV, and the heating target P may be heat treated at the SV.

When the SV is reached, the heater 200 may be controlled by the controller 400 so that the temperature of the interior is kept constant. Then, when a heat duration, i.e., a soak time, required for the heating targets P for the heat treatment expires, the heating is terminated, and the heating target may be taken out or transferred to a temperature increasing stage (ramp-up) or a temperature decreasing state (ramp-down). The controller 400 will be described later in more detail.

The heater 200 may be located on the side or an outer side in the chamber 100 in order to secure an accommodation space for the heating targets P in the chamber 100. Therefore, the heating targets P located at the periphery in the chamber 100 may reach the SV earlier and the heating target P at the center may reach the SV later due to a delay of thermal energy transfer.

The control temperature sensor 300 may be provided to detect the interior temperature of the chamber 100 and may be located near an outer periphery of the heating targets P. The controller 400 may adjust an input amount of thermal energy on the basis of the detected temperature of the chamber interior.

The controller 400 is provided to generally control the temperature in industrial heating chamber.

For example, the controller 400 controls the heater 200 to adjust the input amount of thermal energy according to the temperature of the chamber interior detected by the control temperature sensor 300. Accordingly, the controller 400 may increase the temperature of the interior of the chamber 100 to the SV so that the heating target P may be heat-treated.

In addition, the controller 400 may detect a change in the input thermal energy, determine a temperature equalization time point on the basis of the changing thermal energy, and adjust the soak time.

The soak time refers to a total duration maintained after a control temperature sensor 300 reaches the SV, and may be the sum of a time for which all the heating objects P have an equal temperature state after the SV is reached and a time for which the heating objects P additionally stay for a reaction after the temperature equalization. In the thermal equilibrium state of the soak operation, the controller 400 may input thermal energy as much as heat loss through the wall of the chamber 100 or the like to keep the temperature constant.

That is, the heater 200 may be controlled according to temperatures measured by the control temperature sensor and may be controlled to change the input energy per unit time. When the temperature measured by the control temperature sensor 300 rises close to the SV, the input energy per unit time decreases, and when the thermal equilibrium, that is, a perfect balance, is reached, the input amount of energy per unit time is kept constant.

In other words, the controller 400 calculates the input energy per unit time to determine the temperature equalization time point at which the temperature at the center is reached constant, and if necessary, the soaking stage may be completed after a time for keeping the temperature at the center in the chamber constant at the SV in addition.

However, in the actual process, a temperature tolerance, e.g., between the center and the periphery in the chamber 100 is admitted, and in the case of a steel heating furnace, a lower limit temperature tolerance of about 30° C. is present. In this case, the temperature at the center only needs to reach a minimum allowable temperature, and thus, heating the center up to the SV may unnecessarily waste energy.

In order to solve this problem, the controller 400 adjusts input thermal energy by detecting the temperature of the chamber interior, and here, the controller 400 may detect an arrival time point at which the temperature at the center reaches the minimum allowable temperature (lower specification limit (LSL)) by reflecting the temperature tolerance between the center and the periphery in the chamber 100, and set the soak time on the basis of a variation of input energy per unit time at the arrival time point.

Referring to FIG. 2, the horizontal axis represents time, the left vertical axis represents temperature in the chamber 100, and the right vertical axis represents input thermal energy or the energy regulating signal RS thereof. t21 is a time point at which the temperature at the center reaches the minimum allowable temperature in a partial load state, t22 is a time point at which temperature equalization which is a reference is reached in the partial load state, t23 is a time point at which the temperature at the center reaches the SV in the partial load state, t24 is a time point at which the temperature at the center reaches the minimum allowable temperature in a full load state, and t25 is a time point at which the temperature at the center reaches the SV in the full load state.

As shown in FIG. 2, the temperature at the center in the full load state reaches the SV at the time point t25. However, since the temperature at the center only needs to reach the minimum allowable temperature (lower specification limit), the temperature equalization time point may be set on the basis of a variation α2 of the input energy per unit time at the time point t24 of reaching the minimum allowable temperature. If necessary, the controller 400 may control the heater 200 to further keep the temperature in the chamber 100 within the allowable temperature range from the time point t24.

Therefore, in the case of a steel heating furnace having a large temperature tolerance between the center and the periphery, a soak completion time point required for heating to a temperature within the allowable range may be shortened from the time point t25 to the time point t24.

Meanwhile, in the partial load of the heating targets, the temperature at the center may reach the SV faster than the full load state, and the input amount of thermal energy is lowered more quickly, and the thermal energy needed to sustain the soak operation may also be reduced.

It may be cumbersome to set each reference variation of input thermal energy per unit time according to each load (amount) of the heating targets in preparation for the partial load state, and thus, a reference value may be set and applied to both the full load state and the partial load state.

As shown in FIG. 2, since an absolute value of variation of the input thermal energy per unit time at the minimum allowable temperature is the smallest value in the full load state, the temperature equalization time point is determined on the basis of the variation of the thermal energy per unit time in the full load state and the minimum allowable temperature is exceeded at the corresponding time point. In addition, the absolute value of the variation of the input thermal energy per unit time may be calculated as |dQ/dt| or |dQ/Qdt|.

Here, $\alpha 2$ represents a slope of the variation of the input thermal energy per unit time at a time point of reaching the minimum allowable temperature in the full load state, $\beta 2$ represents a slope at a time point at which a slope of a variation of the input thermal energy per unit time is equal to $\alpha 2$ in the partial load state, and $\gamma 2$ represents a slope of the variation of the input thermal energy per unit time at a time point of reaching the minimum allowable temperature in the partial load state.

In terms of the characteristics of the temperature control apparatus for an industrial heater, the absolute value of the variation of the input thermal energy per unit time decreases as heating continues, and the absolute value of the slope $\gamma 2$ at the time point of reaching the minimum allowable temperature in the partial load state is mathematically larger than the absolute value of the slope $\alpha 2$ at the time point of reaching the minimum allowable temperature in the full load state.

Therefore, if the soak time is applied on the basis of the slope $\alpha 2$, the temperature at the center may exceed the minimum allowable temperature even in the partial load state. That is, the temperature at the center in the chamber 100 exceeds the minimum allowable temperature at the time point t22 when the slope $\beta 2$ equal to the slope $\alpha 2$ is reached in the partial load state.

Through this, the temperature equalization time point may be shortened from the time point t23 to the time point t22 by reflecting the temperature tolerance.

In addition, it is cumbersome to set the variation of the input thermal energy per unit time for every load(amount) as described, but in order to further shorten the soak time in the partial load state of the heating targets P, the load(amount) of the heating targets P and the variation of the input thermal energy per unit time at the time of reaching the minimum allowable temperature may be stored In this way, when a heating target having a load equal to a previously stored amount is accommodated in the chamber, the soak time may be set on the basis of the variation of input thermal energy per unit time based on the load amount. Through this, the temperature equalization time may be shortened further to the time point t21 in the partial load state.

Through this, the thermal equilibrium time point at the center, i.e., the temperature equalization time point reflecting the temperature tolerance prior to perfect temperature equalization may be determined and may be applied to all of loads of heating targets equal to or less than a previously stored amount of the heating targets P on the basis of the variation of the input thermal energy per unit time at the time point of reaching the minimum allowable temperature for the previously stored load (amount). Accordingly, in order to more accurately determine the temperature equalization time point, the application section of the reference load state may be further divided such as 70%, 40%, etc., in addition to the full load state (full Load: 100%).

Meanwhile, in the soak stage after the ramp-down of the heating target P, an arrival time point of the maximum allowable temperature (upper specification limit (USL)) is detected, and a temperature equalization time point is determined on the basis of a variation of the input thermal energy per unit time at the arrival time, based on which the soak time may be corrected.

Specifically, an arrival time point of the maximum allowable temperature may be detected on the basis of a state in which a maximum accommodatable amount of heating targets are accommodated in the chamber 100, a temperature equalization time point may be determined on the basis of the variation of the input thermal energy per unit time at the arrival time point, based on which the soak time may be corrected.

Referring to FIG. 3, the horizontal axis represents time, the left vertical axis represents temperature in the chamber 100, and the right vertical axis represents input thermal energy or the energy regulating signal RS thereof.

t31 represents a time point at which the temperature at the center reaches the maximum allowable temperature in the partial load state, t32 represents a time point at which temperature equalization as a reference is reached in the partial load state, t33 represents a time point at which the temperature at the center reaches the SV in the partial load state, and t34 represents a time point at which the temperature at the center reaches the maximum allowable temperature in the full load state, and t35 represents a time point at which the temperature at the center reaches the SV in the full load state.

As shown in FIG. 3, the above contents (concept) may also be applied in the same manner to a case where the heated heating target P is cooled (ramp-down) and soaked. The temperature at the center in the full load state reaches the SV at the time point t35. Here, since the temperature at the center only needs to reach the maximum allowable temperature (upper specification limit), the temperature equalization time point may be determined on the basis of a variation $\alpha 3$ of the input energy per unit time at the time point t34 of reaching the maximum allowable temperature. In addition, from the time point t34, the controller 400 may control the heater 200 such that the temperature in the chamber 100 is further maintained within an allowable range.

Therefore, the temperature equalization time point may be determined at the time point t34 from the time point t35 by reflecting the temperature tolerance between the center and the periphery, thereby shortening the soak time.

As in the case of heating, in the case of cooling, an absolute value of the variation of the input thermal energy per unit time at the maximum allowable temperature has the smallest value in the full load state, and therefore, the variation of the input thermal energy per unit time in the full load state may be used as a reference in the partial load state as well.

Here, $\alpha 3$ represents a slope of the variation of the input thermal energy per unit time at a time point of reaching the maximum allowable temperature in the full load state, $\beta 3$ represents a slope at a time point at which a slope of a variation of the input thermal energy per unit time is equal to $\alpha 3$ in the partial load state, and $\gamma 3$ represents a slope of the variation of the input thermal energy per unit time at a time point of reaching the maximum allowable temperature in the partial load state.

In terms of the characteristics of the temperature control apparatus for an industrial heater, the absolute value of the variation of the input thermal energy per unit time decreases as cooling continues and the absolute value of the slope $\gamma 3$ at the arrival time of the maximum allowable temperature in the partial load state is mathematically larger than the absolute value of $\alpha 3$ at the arrival time of the maximum allowable temperature in the full load state.

Therefore, if the temperature equalization time point is applied on the basis of the slope $\alpha 3$, the temperature at the center may be equal to or lower than the maximum allowable temperature even in the partial load state. That is, the temperature at the center in the chamber 100 is equal to or lower than the maximum allowable temperature at the time point t32 when the slope $\beta 3$ equal to the slope $\alpha 3$ is reached in the partial load state.

Through this, in the case of the partial load state, the temperature equalization time point may be shortened from the time point t33 to the time point t32.

Therefore, even when some of the heating targets P are accommodated in the chamber 100, the controller 400 may detect a variation of the input thermal energy, and when the variation of the input thermal energy reaches the reference variation of the input thermal energy per unit time, the controller 400 determines that temperature equalization is reached. After the temperature equalization time point, if necessary, the controller 400 may control the heater 200 to maintain the temperature in the chamber 100 further within the allowable range.

In a case where the soak operation is performed after forced cooling using a heat pump or a refrigerant, a change in a cooling regulating signal is similar to a behavior of the change in the input thermal energy during the heating process of FIG. 2. Also, in this case, a temperature equalization time point is obtained and a soak time may be shortened by applying a rate of change in a cooling regulating signal in the full load state to the partial load state by the same principle.

In the soak operation after ramp-down, the application section of the reference load(amount) state may be further divided additionally such as 70%, 40% or the like, in addition to the full load state (full load: 100%) to more accurately determine a temperature equalization time point as in the soak operation after the ramp-up.

Figure 4:
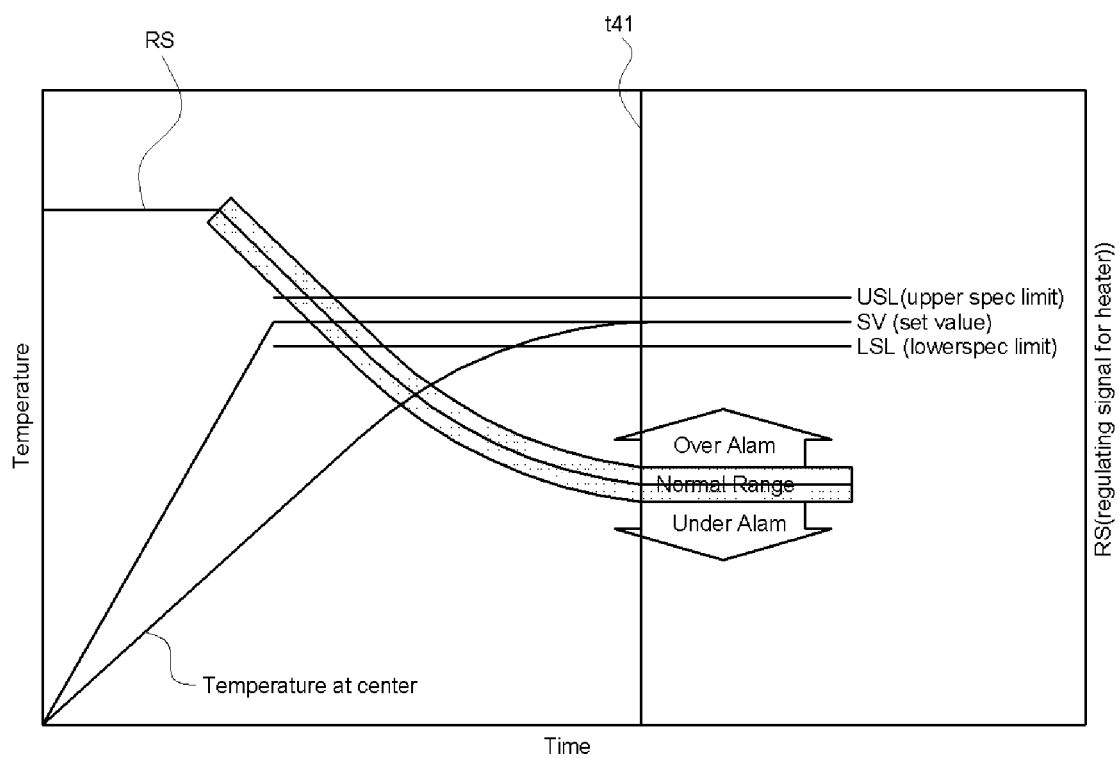
FIG. 4 is a view illustrating an allowable range of a thermal energy supply amount for an industrial heating apparatus according to an embodiment of the present invention.

FIG. 4 is a view illustrating an allowable range of a thermal energy supply amount for an industrial heating apparatus according to an embodiment of the present invention.

Meanwhile, as shown in FIG. 4, the controller 400 may set an allowable range (normal range) of the thermal energy supply amount per time or the regulating signal (RS), and may generate an alarm message (over alarm or under alarm) if the thermal energy supply amount per time exceeds the preset allowable range so that an operator or a manager may recognize the corresponding situation.

Specifically, referring to FIG. 4, the horizontal axis represents time, and the left vertical axis represents temperature in the chamber 100, and the right vertical axis represents a thermal energy supply amount per time or the regulating signal RS thereof.

When the SV is set, the temperature at the center of the chamber 100 reaches the SV later.

The thermal energy supply amount (or RS) may be controlled for a soak stage, and when the center or the like to which heat is transferred the most late reaches the SV (t41), the thermal energy supply amount or the regulating signal RS may become as much as heat loss through the wall of the chamber 100 or the like to keep the temperature constant If abnormal heat insulation, e.g., in such an operation in a state in which the chamber 100 is not completely closed due to foreign matters or the like, occurs or the control temperature sensor 300 or the heater 200 has an error, entire or partial underheating or overheating may occur in the chamber, which may cause a quality problem in the heat-treated objects. In such an abnormal state, the input amount of thermal energy may be increased or decreased as compared with a normal state. Therefore, an abnormality alarm unit may be provided by setting an allowable range of the thermal energy supply amount (or RS) per time. If the thermal energy supply amount (or RS) per time increases above the preset allowable range, an over-alarm message (over alarm) may be generated for the operator or manager to recognize the corresponding situation, and if the thermal energy supply amount (or RS) per time decreases below the allowable range, an under-alarm message (under alarm) may be generated.

In addition, the controller 400 may store the input thermal energy as data and set the allowable range of the thermal energy supply amount per time on the basis of the stored data.

For example, thermal energy supply amount data per time for each load (amount) of heating targets P may be stored, and if a value exceeds a preset error from an average value of cases where the same amount of heating targets are accommodated with respect to an average value of the data or if a value exceeds an average or an error estimated from the stored values of the cases where a similar amount of the current load, an alarm message may be generated.

Figure 5:
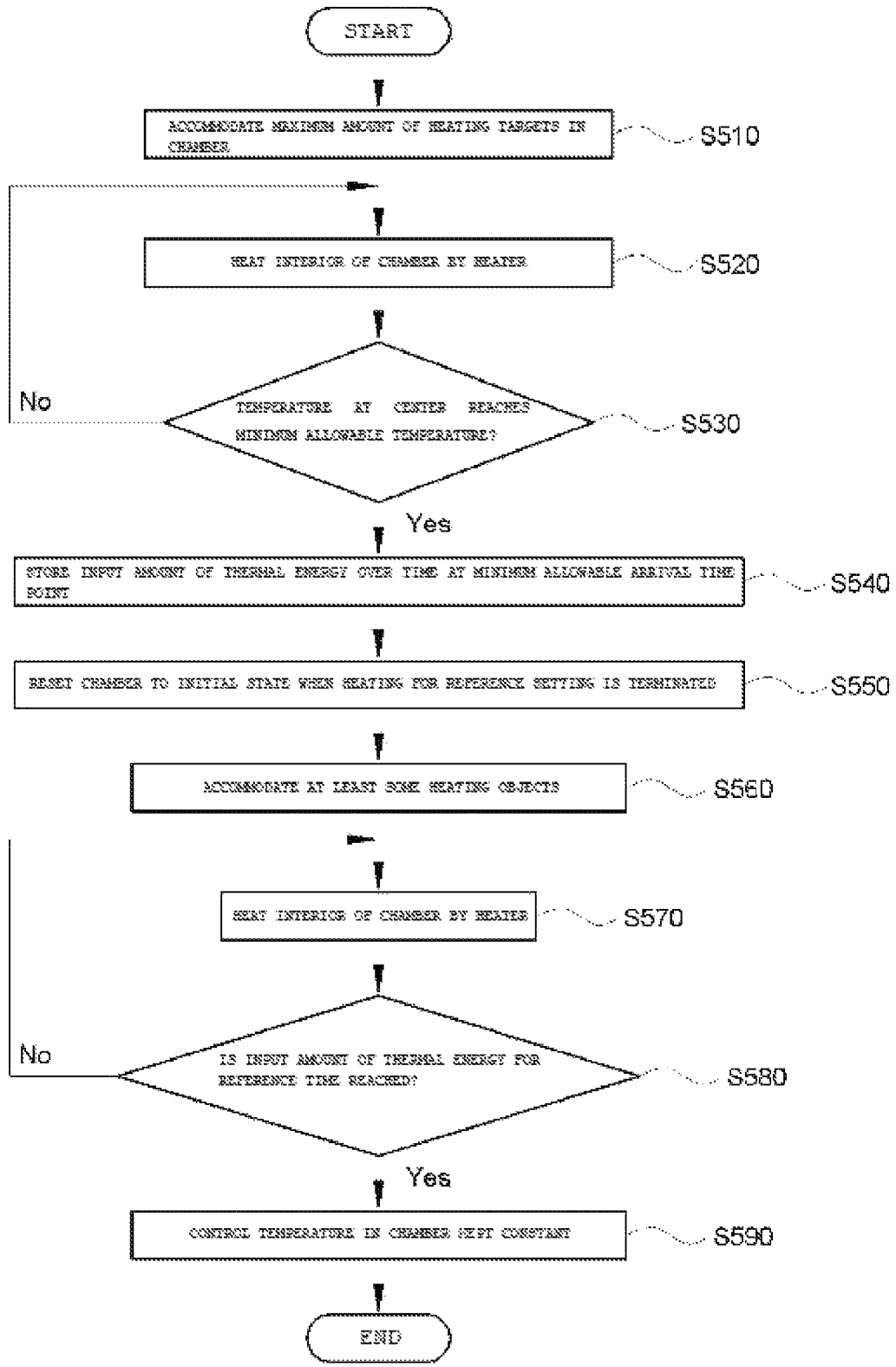
FIG. 5 is a flowchart illustrating the temperature control method for an industrial heating apparatus according to an embodiment of the present invention.

FIG. 5 is a view illustrating a temperature control method for an industrial heating apparatus according to an embodiment of the present invention, relating to an example of a heat treatment process after a soaking operation after one ramp-up.

First, as described above, a maximum accommodatable amount of heating targets may be accommodated in the chamber 100 in operation S510. For a heat treatment, the heater 200 may heat the interior of the chamber 100 in a state in which the maximum number of the heating targets is accommodated in operation S520.

In a soak operation, when a temperature from the temperature sensor separately installed at the center to which heat is transferred the most late reaches a minimum allowable temperature in operation S530 (—Yes), the controller 400 may detect the arrival time point of reaching the minimum allowable temperature and store a variation of input thermal energy per time at the arrival time point in operation S540. If the temperature at the center does not reach the minimum allowable temperature in operation S530 (—No), heating may continue until the minimum allowable temperature is reached in operation S520.

The controller 400 may determine a temperature equalization time point reflecting the temperature tolerance on the basis of the variation of the input thermal energy per unit time at the arrival time point of the minimum allowable temperature.

Once the temperature equalization time point is reached, the temperature in the chamber may be controlled to be kept longer within the allowable range, if necessary, during the soak operation.

When the heating for setting the soak time reference is terminated, the heat-treated heating target may be discharged and the chamber 100 may be reset to an initial state.

In addition, at least some of heating targets may be accommodated in the chamber 100. That is, some or a maximum amount of the heating targets may be accommodated.

Then, the heater 200 may reheat the interior of the chamber in operation S570, and when the reference variation of the input thermal energy per unit time is reached in operation S580 (—Yes), it may be determined that the temperature equalization time point is reached.

Thereafter, during the soak operation, the temperature in the chamber 100 may be controlled to be further kept constant within the allowable range in operation S590.

If the temperature at the center does not reach the minimum allowable temperature in operation S580 (—No), heating may be performed until the minimum allowable temperature is reached.

Through this, the soak operation may be completed on the basis of the temperature equalization time point reflecting the temperature tolerance before the thermal equilibrium time point at the center, and since the temperature equalization time point is determined on the basis of the full load state in which the absolute value of the variation of the input thermal energy per unit time is the smallest at the minimum allowable temperature arrival time point, the temperature at the center exceeds the minimum allowable temperature even when applied to the partial load state, and thus, application may be made regardless of amount of the heating target.

Hereinabove, the embodiments of the disclosure have been described but the disclosure is not limited to the specific embodiment and may be variously modified by a person skilled in the art to which the present invention pertains without departing from the scope of the present invention as claimed in the appended claims and such modifications should not be individually understood from technical concepts or prospects of the present invention.

| [Detailed Description of Main Elements] | |
|---|---|
| 100: chamber | 200: heater |
| 300: control temperature sensor | 400: controller |
| P: heating target | S: mounting table |

The invention claimed is:

1. A temperature controllers for an industrial heating apparatus comprising:
a chamber, the chamber comprising an interior sized for accommodating a plurality of heating targets; the chamber interior comprising a central portion and a periphery;
a heater; the heater configured for inputting thermal energy to heat the chamber interior;
a control temperature sensor configured for measuring the temperature of the chamber interior; and
a controller configured to control the heater inputting thermal energy;
wherein the controller controls the heater inputting thermal energy by detecting the temperature of the chamber interior from the control temperature sensor, and when there is a preset temperature tolerance in the central portion and the periphery of the chamber interior, the controller detects an arrival time point at which the temperature at the central portion of the chamber interior, which is a portion to which heat is transferred latest, reaches an allowable temperature limit, the controller to determine a temperature equalization time point with respect to a variation of input thermal energy per unit time at the arrival time point, and the controller corrects the soak time.

2. The temperature controllers of claim 1, wherein the controller corrects the soak time by determining the equalization time point on the basis of a state in which a maximum accommodatable amount of the plurality of heating targets are accommodated in the chamber interior, detects a change in the input thermal energy when at least some of the heating targets are accommodated in the chamber interior, determines that the temperature equalization time point arrives when the variation of the input thermal energy per unit time on the basis of a state in which a maximum accomodatable amount of the plurality of heating targets are accommodated in the chamber interior is reached, and controls the heater so that the temperature in the chamber interior is further maintained for a predetermined time within an allowable temperature as necessary.

3. The temperature controllers of claim 2, wherein the controller stores the amount of the heating targets and a variation of the input thermal energy per unit time at a minimum allowable temperature arrival time in a state in which the heating targets are partially accommodated, and sets the soak time with respect to the stored variation of the input thermal energy per unit time when heating targets having an amount equal to or smaller than the stored amount is accommodated in the chamber interior.

4. The temperature controllers of claim 1, wherein the controller is configured to set an allowable range of a thermal energy supply amount per time, and when the thermal energy supply amount per time exceeds the preset allowable range, the controller generates an alarm message so that an operator or a manager recognizes the alarm message.

5. The temperature controllers of claim 4, wherein the controller stores the input thermal energy as data and sets the allowable range of the thermal energy supply amount per time on the basis of the stored data.

6. The temperature controllers of claim 5, wherein the controller determines an average value of data of the thermal energy supply amount per time of cases where the same amount of heating targets are accommodated, and generates the alarm message when the thermal energy supply amount per time exceeds the average value by a preset error.

7. A temperature control method for an industrial heating apparatus, the method comprising:
accommodating a maximum accommodatable amount of heating targets in a chamber interior;
inputting thermal energy with a heater so that the heater heats the chamber interior;
adjusting, by a controller, the input thermal energy by detecting the chamber interior temperature through a control temperature sensor, and storing, by the controller, a variation of the input thermal energy per unit time at a minimum allowable temperature arrival time, as a reference of a soak time, when a temperature of a central portion of the chamber interior, measured by a temperature sensor separately configured for measuring the temperature at the central portion of the chamber interior, which is a portion to which heat is transferred latest reaches a minimum allowable temperature;
returning the chamber interior to an initial state when heating for a reference setting is terminated;
accommodating at least some of the heating targets in the chamber;

re-inputting thermal energy so that the chamber interior is heated by the heater; and detecting, by the controller, a variation of the re-input thermal energy, determining that a temperature equalization time point arrives when the variation of the input thermal energy per unit time is reached, and controlling the heater so that a temperature in the chamber interior is maintained longer by a predetermined time within an allowable range as necessary.

* * * * *